(12) United States Patent
Yoshida et al.

(10) Patent No.: US 7,346,760 B2
(45) Date of Patent: Mar. 18, 2008

(54) DATA PROCESSING APPARATUS OF HIGH SPEED PROCESS USING MEMORY OF LOW SPEED AND LOW POWER CONSUMPTION

(75) Inventors: Toyohiko Yoshida, Hyogo (JP); Akira Yamada, Hyogo (JP); Hisakazu Sato, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 388 days.

(21) Appl. No.: 09/855,594

(22) Filed: May 16, 2001

(65) Prior Publication Data

US 2002/0026545 A1    Feb. 28, 2002

(30) Foreign Application Priority Data

Aug. 28, 2000    (JP)    ............................. 2000-257231

(51) Int. Cl.
    G06F 9/30    (2006.01)
    G06F 9/38    (2006.01)

(52) U.S. Cl. ..................................... 712/213; 712/219

(58) Field of Classification Search ................ 712/241, 712/205, 207, 213, 219; 711/5, 123
    See application file for complete search history.

(56) References Cited

U.S. PATENT DOCUMENTS

| | | | | |
|---|---|---|---|---|
| 4,626,988 A | * | 12/1986 | George | ........................ 712/241 |
| 5,214,786 A | * | 5/1993 | Watanabe et al. | ............. 712/41 |
| 5,483,497 A | * | 1/1996 | Mochizuki et al. | .... 365/230.03 |
| 5,544,342 A | * | 8/1996 | Dean | .......................... 711/119 |
| 5,579,493 A | * | 11/1996 | Kiuchi et al. | ................ 712/207 |
| 5,892,729 A | * | 4/1999 | Holder, Jr. | ................... 365/233 |
| 5,901,301 A | | 5/1999 | Matsuo et al. | |
| 6,125,440 A | * | 9/2000 | Osovets | ...................... 712/205 |

FOREIGN PATENT DOCUMENTS

EP    511484 A2 *  11/1992
EP    511484 A2 *  11/1992

OTHER PUBLICATIONS

Computer Architecture A Quantitative Approach; John L hennessy and David A Patterson; Morgan Kaufman Publishers; 4th printing; 1990; pp. 18-20 and 361-363.*
John Hennessy et al., "COmputer Architecture A Quantitative Approach", Morgan Kaufman Publisher, 4th printing, 1990, pp. 18-20, 361-363.*
"Computer Architecture A Quantitative Approach", John Hennessy et al, Morgan Kaufman Publisher, 4th printing, 1990, pp. 18-20 and 361-363.*
"80386 Hardware Reference Manual", Intel Corp. 1986, 87.

* cited by examiner

Primary Examiner—Daniel Pan
(74) Attorney, Agent, or Firm—McDermott Will & Emery LLP

(57) ABSTRACT

When fetching an instruction from a plurality of memory banks, a first pipeline cycle corresponding to selection of a memory bank and a second pipeline cycle corresponding to instruction readout are generated to carry out a pipeline process. Only the selected memory bank can be precharged to allow reduction of power consumption. Since the first and second pipeline cycles are effected in parallel, the throughput of the instruction memory can be improved.

3 Claims, 22 Drawing Sheets

| 0 | | | | | | | | 7 | 8 | | | | | | 15 |
|---|---|---|---|---|---|---|---|---|---|---|---|---|---|---|---|
| SM | DB | 0 | 0 | 0 | IE | RP0 | MD0 | RP1 | MD1 | FS0 | FS1 | 0 | 0 | 0 | 0 |

| 16 | | | | | | | 23 | 24 | | | | | | | 31 |
|---|---|---|---|---|---|---|---|---|---|---|---|---|---|---|---|
| 0 | F0 | F1 | 0 | F2 | 0 | F3 | 0 | F4 | 0 | F5 | 0 | F6 | 0 | F7 |

FIG.4

| Code | Conditions to be executed | Description |
|---|---|---|
| CC = 000 | Always | --- |
| CC = 001 | F0 = T and F1 = don't care | /TX |
| CC = 010 | F0 = F and F1 = don't care | /FX |
| CC = 011 | F0 = don't care and F1 = T | /XT |
| CC = 100 | F0 = don't care and F1 = F | /XF |
| CC = 101 | F0 = T and F1 = T | /TT |
| CC = 110 | F0 = T and F1 = F | /TF |
| CC = 111 | Reserved | --- |

| FM | Number of sub-instructions | Issuing Order L-container | Issuing Order R-container |
|---|---|---|---|
| 00 | two | 1st | 1st |
| 01 | two | 1st | 2nd |
| 10 | two | 2nd | 1st |
| 11 | one | 1st | ---- |

| FIG. 13A Short_M | opcode | X | Ra | Rb | src |
|---|---|---|---|---|---|
| | 0  7 | 9 | 15 | 21 | 27 |

| FIG. 13B Short_A | opcode | Y 0 | Ra | Rb | src |
|---|---|---|---|---|---|
| | 0  7 | 9 | 15 | 21 | 27 |

| FIG. 13C Short_B1 | opcode | 0 0 | 0 | 0 | Rc |
|---|---|---|---|---|---|
| | 0  7 | 9 | 15 | 21 | 27 |

FIG. 13D Short_B2: opcode | 1 0 | disp:18
0  7    9           27

| FIG. 13E Short_B3 | opcode | F Z | Ra | | src |
|---|---|---|---|---|---|
| | 0  7 | 9 | 15 | | 27 |

| FIG. 13F Short_D1 | opcode | F 0 | Ra | | src |
|---|---|---|---|---|---|
| | 0  7 | 9 | 15 | | 27 |

| FIG. 13G Short_D2 | opcode | F 0 | ct:6 | | src |
|---|---|---|---|---|---|
| | 0  7 | 9 | 15 | 21 22 | 27 |

FIG. 13H Long: opcode | 1 0 | Ra | Rb | imm:32
0  7   9    15   21   26  31 36   43 46   53    63

FIG.14A  ALU  | IF0 | IF1 | IF2 | D | R | E0 | W |

FIG.14B  MAC  | IF0 | IF1 | IF2 | D | R | E0 | E1 |

FIG.14C  LD/ST | IF0 | IF1 | IF2 | D | R | M0 | M1 | M2 | W |

FIG.14D  BRA  | IF0 | IF1 | IF2 | D | R/A | W |

FIG.14E  ALU  | IF0 | IF1 | D | R | E0 | W |

FIG.14F  MAC  | IF0 | IF1 | D | R | E0 | E1 |

FIG.14G  LD/ST | IF0 | IF1 | D | R | M0 | M1 | W |

FIG.14H  BRA  | IF0 | IF1 | D | R/A | W |

FIG.16

- Load/Store instructions
  - LDB       Load one byte to a register with sign extension
  - LDBU      Load one byte to a register with zero extension
  - LDH       Load one half-word to a register with sign extension
  - LDHH      Load one half-word to a register high
  - LDHU      Load one half-word to a register with zero extension
  - LDW       Load one word to a register
  - LD2W      Load two words to registers
  - LD4BH     Load four bytes to four half-word registers with sign extension
  - LD4BHU    Load four bytes to four half-word registers with zero extension
  - LD2H      Load two half-words to registers
  - STB       Store one byte from a register
  - STH       Store one half-word from a register
  - STHH      Store one half-word from a register high
  - STW       Store one word from a register
  - ST2W      Store two words from registers
  - ST4HB     Store four bytes from four half-word registers
  - ST2H      Store two half-words from registers
  - MODDEC    Decrement a register value by a 5-bit immediate value
  - MODINC    Increment a register value by a 5-bit immediate value

- Transfer instructions
  - MVFSYS    Move a control register to a general purpose register
  - MVTSYS    Move a general purpose register to a control register
  - MVFACC    Move a word from an accumulator
  - MVTACC    Move two general purpose registers to an accumulator

- Compare instructions
  - CMPcc     Compare
              cc = EQ (000), NE (001), GT (010), GE (011), LT (100),
                   LE (101), PS - both positive (110), NG - both negative (111)
  - CMPUcc    Compare unsigned
              cc = GT (010), GE (011), LT (100), LE (101)

FIG.17

- Arithmetic operation instructions
  - ABS          Absolute
  - ADD          Add
  - ADDC        Add with carry
  - ADDHppp    Add half-word
    - ppp =    LLL (000), LLH (001), LHL (010), LHH (011), HLL (100), HLH (101), HHL (110), HHH (111)
  - ADDS        Add register Rb with the sign of the third operand
  - ADDS2H     Add sign to two half-word
  - ADD2H      Add two pairs of half-words
  - AVG          Average with rounding towards positive infinity
  - AVG2H      Average two pairs of half-words rounding towards positive infinity
  - JOINpp      Join two half-words
    - pp = LL (00), LH (01), HL (10), HH (11)
  - SUB          Subtract
  - SUBB        Subtract with borrow
  - SUBHppp    Subtract half-word
    - ppp =    LLL (000), LLH (001), LHL (010), LHH (011), HLL (100), HLH (101), HHL (110), HHH (111)
  - SUB2H      Subtract two pairs of half-words

- Logical operation instructions
  - AND          logical AND
  - OR           logical OR
  - NOT          logical NOT
  - XOR          logical exclusive OR
  - ANDFG      logical AND flags
  - ORFG        logical OR flags
  - NOTFG      logical NOT a flag
  - XORFG      logical exclusive OR flags

- Shift operation instructions
  - SRA          Shift right arithmetic
  - SRAHp      Shift right arithmetic a half-word    p = L (0), H (1)
  - SRA2H      Shift right arithmetic two half-words
  - SRC          Shift right concatenated registers
  - SRL          Shift right logical
  - SRLHp      Shift right logical a half-word          p = L (0), H (1)
  - SRL2H      Shift right logical two half-words
  - ROT          Rotate right
  - ROT2H      Rotate right two half-words

- Bit operation instructions
  - BCLR        Clear a bit
  - BNOT        Invert a bit
  - BSET         Set a bit
  - BTST         Test a bit

FIG.18

- Branch instructions
  - BRA — Branch
  - BRATZR — Branch if zero
  - BRATNZ — Branch if not zero
  - BSR — Branch to subroutine
  - BSRTZR — Branch to subroutine if zero
  - BSRTNZ — Branch to subroutine if not zero
  - DBRA — Delayed Branch
  - DBRAI — Delayed Branch immediate
  - DBSR — Delayed Branch to subroutine
  - DBSRI — Delayed Branch immediate to subroutine
  - DJMP — Delayed Jump
  - DJMPI — Delayed Jump immediate
  - DJSR — Delayed Jump to subroutine
  - DJSRI — Delayed Jump immediate to subroutine
  - JMP — Jump
  - JMPTZR — Jump if zero
  - JMPTNZ — Jump if not zero
  - JSR — Jump to subroutine
  - JSRTZR — Jump to subroutine if zero
  - JSRTNZ — Jump to subroutine if not zero
  - NOP — No operation

- OS-related instructions
  - TRAP — Trap
  - REIT — Return from exception, interrupts, and traps

- DSP Arithmetic operation instructions
  - MUL — Multiply
  - MULX — Multiply with extended precision
  - MULXS — Multiply and shift to the left by one with extended precision
  - MULX2H — Multiply two pairs of half-words with extended precision
  - MULHXpp — Multiply two half-words with extended precision
    pp = LL (00), LH (01), HL (10), HH (11)
  - MUL2H — Multiply two pairs of half-words
  - MACd — Multiply and add                                        (d = 0, 1)
  - MACSd — Multiply, shift to the left by one, and add            (d = 0, 1)
  - MSUBd — Multiply and subtract                                  (d = 0, 1)
  - MSUBSd — Multiply, shift to the left by one, and subtract      (d = 0, 1)
  - SAT — Saturate
  - SATHH — Saturate word operand into high half-word
  - SATHL — Saturate word operand into low half-word
  - SATZ — Saturate into positive number
  - SATZ2H — Saturate two half-words into positive number
  - SAT2H — Saturate two half-word operands

- Repeat instructions
  - REPEAT0 — Repeat a block of instructions #0
  - REPEAT1 — Repeat a block of instructions #1
- Debugger supporting instructions
  - DBT — Debug trap
  - RTD — Return from debug interrupt and trap

FIG.20

- Operation:
    REPEAT1 #count, #pcaddr
        RPT1_C = #count-1
        RPT1_S = PC + 8
        RPT1_E = PC + pcaddr
        RPT1_I(0:5) = Instructions at memory((PC+8):(PC+48))
        if (PC ==RPT1_E && RPT1_C > 0) {
            RPT1_C--
            PC == RPT1_S
        }
- Example:
    REPEAT1 #20, #48
    START:LD2W R10, @(R30+, R0) ‖ MAC0 R0, R12, R22 ⎤
          LD2W R20, @(R31+, R0) ‖ MAC0 R0, R13, R23 ⎥
          LD2W R12, @(R30+, R0) ‖ MAC0 R0, R14, R24 ⎥ Zero-
          LD2W R22, @(R31+, R0) ‖ MAC0 R0, R15, R25 ⎥ overhead
          LD2W R14, @(R30+, R0) ‖ MAC0 R0, R16, R26 ⎥ loop
    END:LD2W R24, @(R31+, R0) ‖ MAC0 R0, R17, R27 ⎦

FIG.22

- Operation:
    REPEAT0 #count, #pcaddr
        RPT0_C = #count-1
        RPT0_S = PC + 8
        RPT0_E = PC + pcaddr
        RPT0_I = Instruction at memory(PC+8)
        if (PC ==RPT0_E && RPT0_C > 0) {
          RPT0_C--
          PC == RPT0_S
        }
- Example:
    REPEAT0 #10, #64
    START:LD2W R10, @(R30+, R0) ‖ MAC0 R0, R12, R22  ⎤
          LD2W R20, @(R31+, R0) ‖ MAC0 R0, R13, R23  ⎥
          LD2W R12, @(R30+, R0) ‖ MAC0 R0, R14, R24  ⎥
          LD2W R22, @(R31+, R0) ‖ MAC0 R0, R15, R25  ⎥ Zero-
          LD2W R14, @(R30+, R0) ‖ MAC0 R0, R16, R26  ⎬ overhead
          LD2W R24, @(R31+, R0) ‖ MAC0 R0, R17, R27  ⎥ loop
          LD2W R16, @(R30+, R0) ‖ MAC0 R0, R10, R20  ⎥
    END:LD2W R26, @(R31+, R0) ‖ MAC0 R0, R11, R21    ⎦

DATA PROCESSING APPARATUS OF HIGH SPEED PROCESS USING MEMORY OF LOW SPEED AND LOW POWER CONSUMPTION

BACKGROUND OF THE INVENTION

1. Field of the Invention

The present invention relates to a data processing apparatus that carries out processing while accessing instructions and data stored in an internal memory. Particularly, the present invention relates to a data processing apparatus capable of processing at high speed using a memory of low speed and low power consumption.

2. Description of the Background Art

In recent years, data processing apparatuses such as a CPU (Central-Processing Unit) and the like have become more widespread, and the demand to improve the processing speed of the data processing apparatus seems insatiable. In the conventional data processing apparatus such as a CPU, the instruction fetch mechanism, instruction decoding mechanism, instruction execution mechanism, and the like are set in a pipelined manner. The processing performance of the data processing apparatus is improved by increasing the frequency of the operating clock as well as reducing the access cycle of the memory to obtain memory access within one pipeline cycle time (one clock of the operating dock).

However, it is difficult to realize a memory of large capacity with a short access time. This issue was solved by building a memory of high speed and low capacity represented by a cache memory and a main memory of low speed and large capacity in a hierarchical manner to carry out operation as if there was a memory of high speed and of large capacity. The conventional data processing apparatus employing such a hierarchical memory is disclosed in many documents.

In realizing a memory of large capacity and high speed by the configuration of the hierarchical memory, a wait cycle must be inserted in the memory access cycles when the data processing apparatus is to access an instruction or data that could not be incorporated in the high speed memory of small capacity (cache miss). There was a problem that the performance of the data processing apparatus is degraded. In order to increase the operation speed of the memory, the drivability of the transistor employed in the memory must be increased. There was a problem that the power consumption of the memory is increased if a high speed memory of large capacity is incorporated in the data processing apparatus.

SUMMARY OF THE INVENTION

An object of the present invention is to provide a data processing apparatus capable of processing at high throughput using a memory of low speed and low power consumption to improve the processing performance.

Another object of the present invention is to provide a data processing apparatus that can prevent generation of continuous access to the same memory bank even when a repeat instruction is executed in a structure that fetches an instruction from an instruction memory divided into a plurality of memory banks to improve the processing performance.

A further object of the present invention is to provide a data processing apparatus that can prevent generation of continuous access to the same memory bank such as in the case of reading out alternately variable data and coefficient data in a structure that accesses a data memory divided into a plurality of memory banks to improve the processing performance.

According to an aspect of the present invention, a data processing apparatus includes an instruction memory storing an instruction, a data memory storing data, an instruction decoder decoding a fetched instruction, a memory operation unit connected to the instruction memory, the data memory and the instruction decoder to fetch an instruction stored in the instruction memory to access the data memory according to the decoded result of the instruction decoder, and an integer operation unit carrying out an integer operation according to the decoded result of the instruction decoder. The instruction memory includes a plurality of instruction memory banks. The memory operation unit generates a pipeline cycle corresponding to selection of an instruction memory bank and a pipeline cycle corresponding to an instruction readout when an instruction is to be fetched from a plurality of instruction memory banks to carry out a pipeline process.

Since the memory operation unit generates a pipeline cycle corresponding to selection of an instruction memory bank and a pipeline cycle corresponding to an instruction readout, the selected instruction memory bank alone can be precharged. Therefore, power consumption can be reduced. Also, since the pipeline cycle corresponding to selection of an instruction memory bank and the pipeline cycle corresponding to an instruction readout are effected in parallel, the throughput of the instruction memory access can be improved.

According to another aspect of the present invention, a data processing apparatus includes an instruction memory storing an instruction, a data memory storing data, an instruction decoder decoding a fetched instruction, a register file with a plurality of registers, a memory operation unit connected to the instruction memory, the data memory and the instruction decoder to fetch an instruction stored in the instruction memory to access the data memory according to the decoded result of the instruction decoder, and an integer operation unit carrying out an integer operation according to the decoded result of the instruction decoder. The memory operation unit retains the instruction immediately succeeding the repeat instruction in a dedicated register in the register file when a repeat instruction is executed. The repeat instruction is executed while fetching the instruction held in the dedicated register.

Since the memory operation unit executes the repeat instruction while fetching the instruction retained in the dedicated register, continuous access to the same memory bank will not occur even when an instruction is to be fetched from the instruction memory divided into a plurality of memory banks. Therefore, the processing performance can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram to describe the detail of a PSW.

FIGS. 13A-13H show the format of a sub instruction retained in an L container 205 and an R container 206.

FIGS. 14A-14H are diagrams to describe the pipeline process of core 100 according to an embodiment of the present invention.

FIG. 16 is a diagram showing a list of a load/store instructions, data transfer instructions and compare instructions.

FIG. 17 shows a list of arithmetic operation instructions, logical operation instructions, shift operation instructions, and bit operation instructions.

FIG. 18 shows a list of branch instructions, OS related instructions, DSP related instructions, repeat instructions and debugger supporting instructions.

FIG. 20 shows the operation of a REPEAT1 instruction and an example of an FIR filter process program using this instruction.

FIG. 22 shows the operation of a REPEAT0 instruction and an example of an FIR filter process program using this instruction.

DESCRIPTION OF THE PREFERRED EMBODIMENTS

Figure 1:
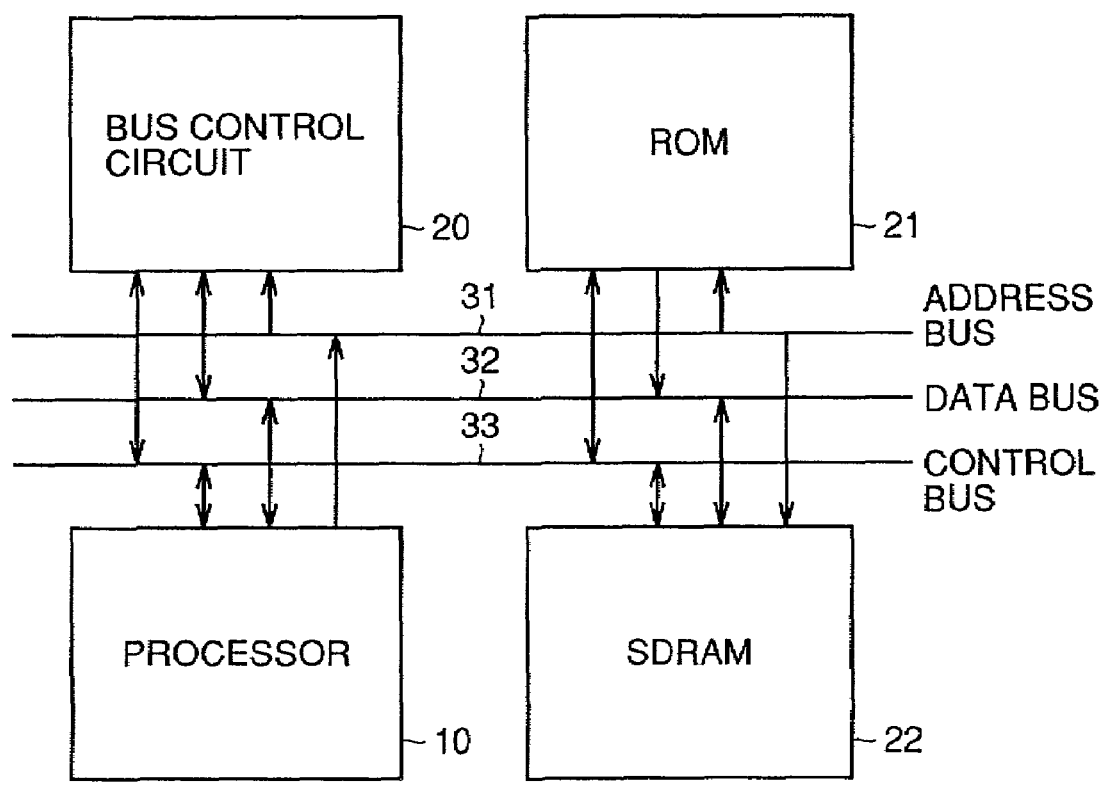
FIG. 1 is a block diagram showing a schematic structure of a data processing apparatus employing a processor 10 according to an embodiment of the present invention.

FIG. 1 is a block diagram showing a schematic structure of a data processing apparatus employing a processor according to an embodiment of the present invention. The data processing apparatus includes a processor 10, a bus control circuit 20, a ROM (Read Only Memory) 21, and an SDRAM (Synchronous Dynamic Random Access Memory) 22. Processor 10, bus control circuit 20, ROM 21 and SDRAM 22 are connected through an address bus 31, a data bus 32 and a control bus 33.

Processor 10 outputs an address to bus control circuit 20, ROM 21 and SDRAM 22 via address bus 31. When processor 10 writes data into SDRAM 22, data is provided to SDRAM 22 via data bus 32. When processor 10 reads out data from ROM 21 or SDRAM 22, the data output from ROM 21 or SDRAM 22 is applied via data bus 32. Bus control circuit 20 receives a control signal output from processor 10 to generate and output a signal to control ROM 21, SDRAM 22, and the like.

Figure 2:
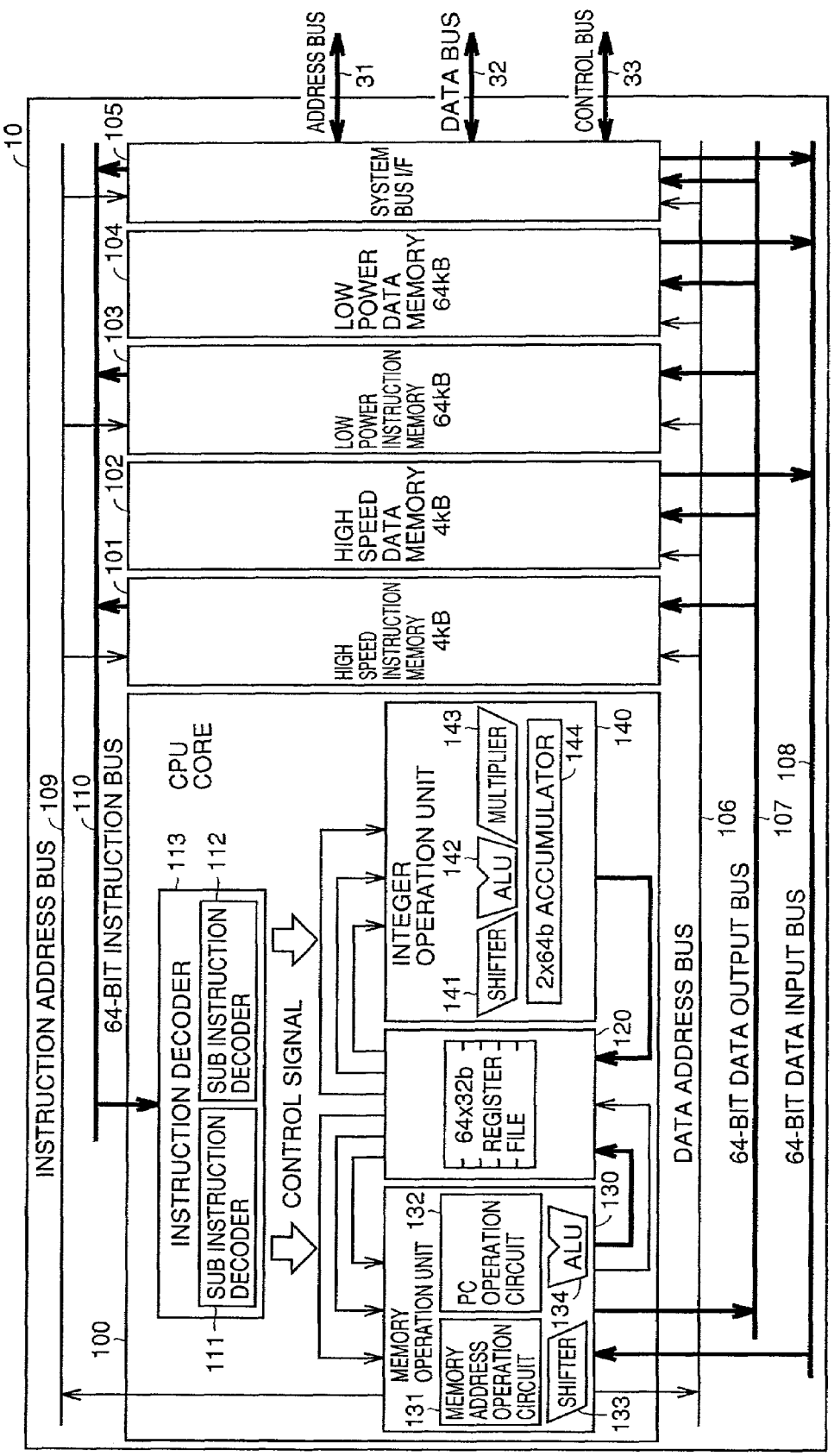
FIG. 2 is a block diagram showing a schematic structure of processor 10 according to an embodiment of the present invention.

FIG. 2 is a block diagram showing a schematic structure of processor 10 of the present embodiment. Processor 10 includes a CPU core (simply called "core" hereinafter) 100 of the VLIW (Very Long Instruction Word) scheme, a high speed instruction memory 101, a high speed data memory 102, a low power instruction memory 103, a low power data memory 104, and a system bus I/F (referred to as "bus interface unit" hereinafter) 105 connected to an external bus control circuit 20, ROM 21 and SDRAM 22 via address bus 31, data bus 32 and control bus 33.

Core 100, high speed instruction memory 101, high speed data memory 102, low power instruction memory 103 and low power data memory 104 are connected to a data address bus 106, a data output bus 107 and a data input bus 108. Core 100, high speed instruction memory 101, low power instruction memory 103 and bus interface unit 105 are connected also to instruction address bus 109 and instruction bus 110 in order to access data and an instruction in parallel.

Core 100 has the 2-way VLIW type instruction system to execute a VLIW instruction including two sub instructions. Core 100 includes an instruction decoder 113 decoding a VLIW instruction input through instruction bus 110, a register file 120, a memory operation unit 130 executing an address operation instruction, and an integer operation unit 140 executing an integer operation instruction.

Instruction decoder 113 includes sub instruction decoders 111 and 112 decoding respective sub instructions in the VLIW instruction. Memory operation unit 130 includes a memory address operation circuit 131, a PC (Program Counter) operation circuit 132, a shifter 133, and an ALU (Arithmetic and Logic Unit) 134. Integer operation unit 140 includes a shifter 141, an ALU 142, a multiplier 143, and 64-bit accumulators 144.

Memory operation unit 130 and integer operation unit 140 execute respective sub instructions according to the decoded results of the two sub instruction decoders 111 and 112, corresponding to the cases of executing the two sub instructions in parallel and the two sub instructions in order. Register file 120 includes 64 general-purpose registers capable of reading by software.

Figure 3:
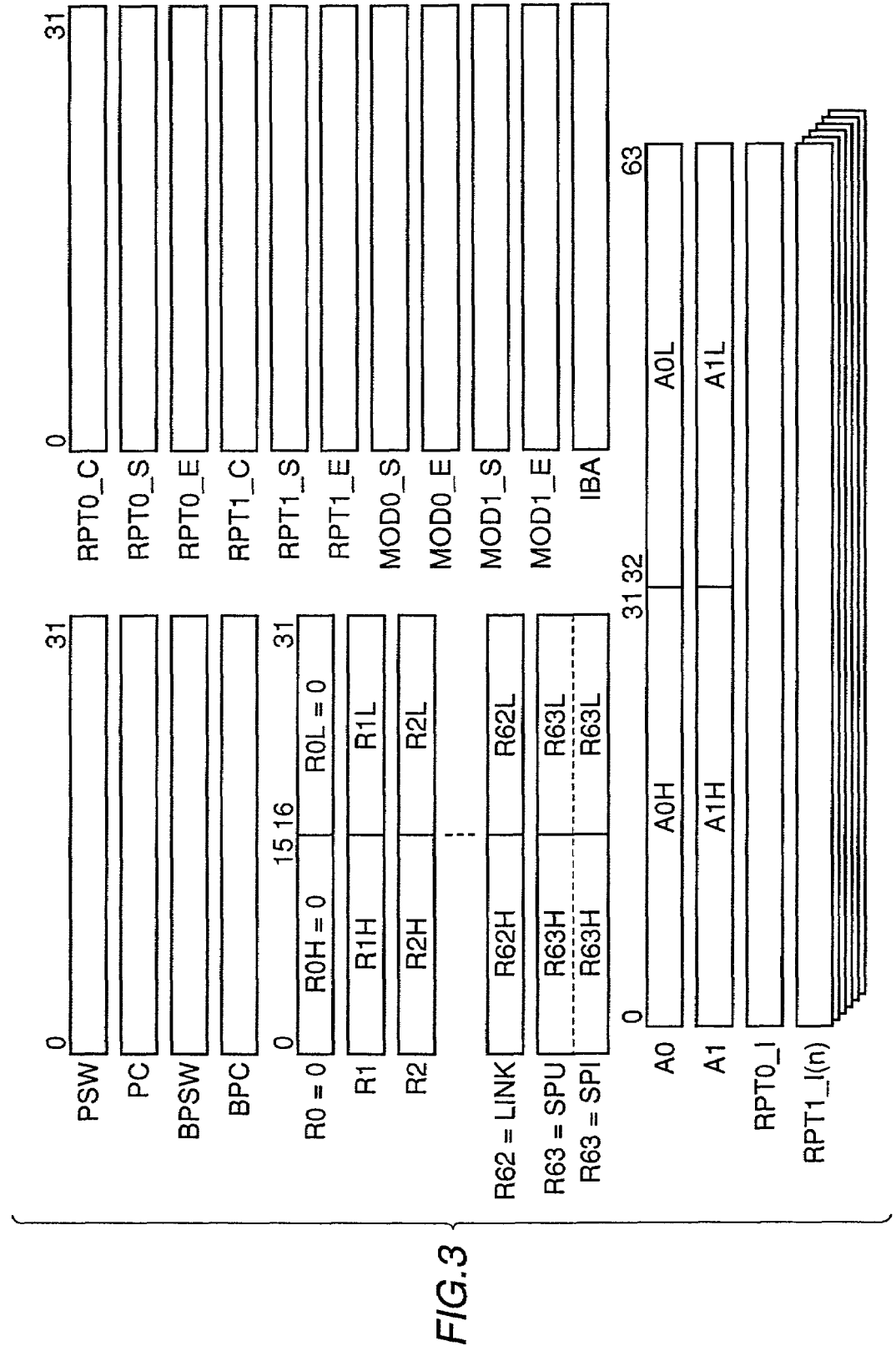
FIG. 3 is a diagram to describe the register of a core 100.

FIG. 3 is a diagram to describe registers in core 100. General-purpose registers R0-R63 are present in register file 120 described above. Register R0 is a register that always retains "0", and is used in clearing other registers. Register R62 is a link pointer to retain the return address of a subroutine. Register R63 is a stack pointer in a non-interrupt process or in an interrupt process, switched by a mode bit SM in the PSW (Processor Status Word) that will be described afterwards.

Accumulators A0 and A1 are registers to store the multiplication result or the multiply-and-accumulate operation result, having a bit length of 64 bits which is two times that of the general-purpose register.

Registers RPT0_C, RPT0_S, RPT0_E and RPT0_I are used when hardware loop control is effected according to a repeat instruction REPEAT0. Register RPT0_C stores the loop counter value. Registers RPT0_S and RPT0_E store the addresses of the first instruction and last instruction of a loop, respectively. Register RPT0_I stores the instruction code of the head instruction of the loop.

Registers RPT1_C, RPT1_S, RPT1_E and RPT1_I are used when hardware loop control is effected according to a repeat instruction REPEAT1. Register RPT1_C stores the loop counter value. Registers RPT1_S and RPT1_E store the addresses of the first instruction and last instruction, respectively, of a loop. Register RPT1_I(n) stores six instruction codes in order from the head instruction of the loop.

Register PSW is a register storing a flag or the like which is a processor status word to control core 100. Register PC stores the address of the instruction that is currently executed by core 100. Registers BPSW and BPC correspond to the PSW and PC for backup, and have the values of the PSW and PC copied automatically when there is an event of interruption or the like.

Registers MOD0_S, MOD0_E MOD1_S and MOD1_E are directed to control the modulo addressing used in a loop buffer or the like. Registers MOD0_S and MOD0_E form a pair to store the first address and the last address of a loop buffer. Also, registers MOD1_S and MOD1_E form a pair to store the first address and the last address of another loop buffer.

Register IBA stores the value of a break point address when the debugger specifies the break point address.

FIG. 4 is a diagram to describe the details of the PSW. The SM bit indicates whether in an interrupt process or a non-interrupt process, and is a mode bit to switch between register R63 (SPU) and R63 (SPI). The DB bit indicates whether in a debugging operation or not. When the bit of DB is "1", register IBA is rendered valid. IE bit indicates whether in an interruption permitted state or an interruption inhibited state. In an interruption permitted state, interruption is accepted at a break of a VLIW instruction when there is an interruption request from an external source.

Bits RP0 and RP1 indicate the value of "1" when the hardware loop control is enabled upon execution of respective repeat instructions REPEAT0 and REPEAT1. Bits FS0 and FS1 indicate "1" only in the first hardware loop during the execution of respective repeat instructions REPEAT0 and REPEAT1.

Bits MD0 and MD1 define whether to enable or disable the modulo addressing by MOD0_S and MOD0_E, and MOD1_S and MOD1_E, respectively. Bits F0-F7 are used to control the execution condition of an instruction.

Figure 5:
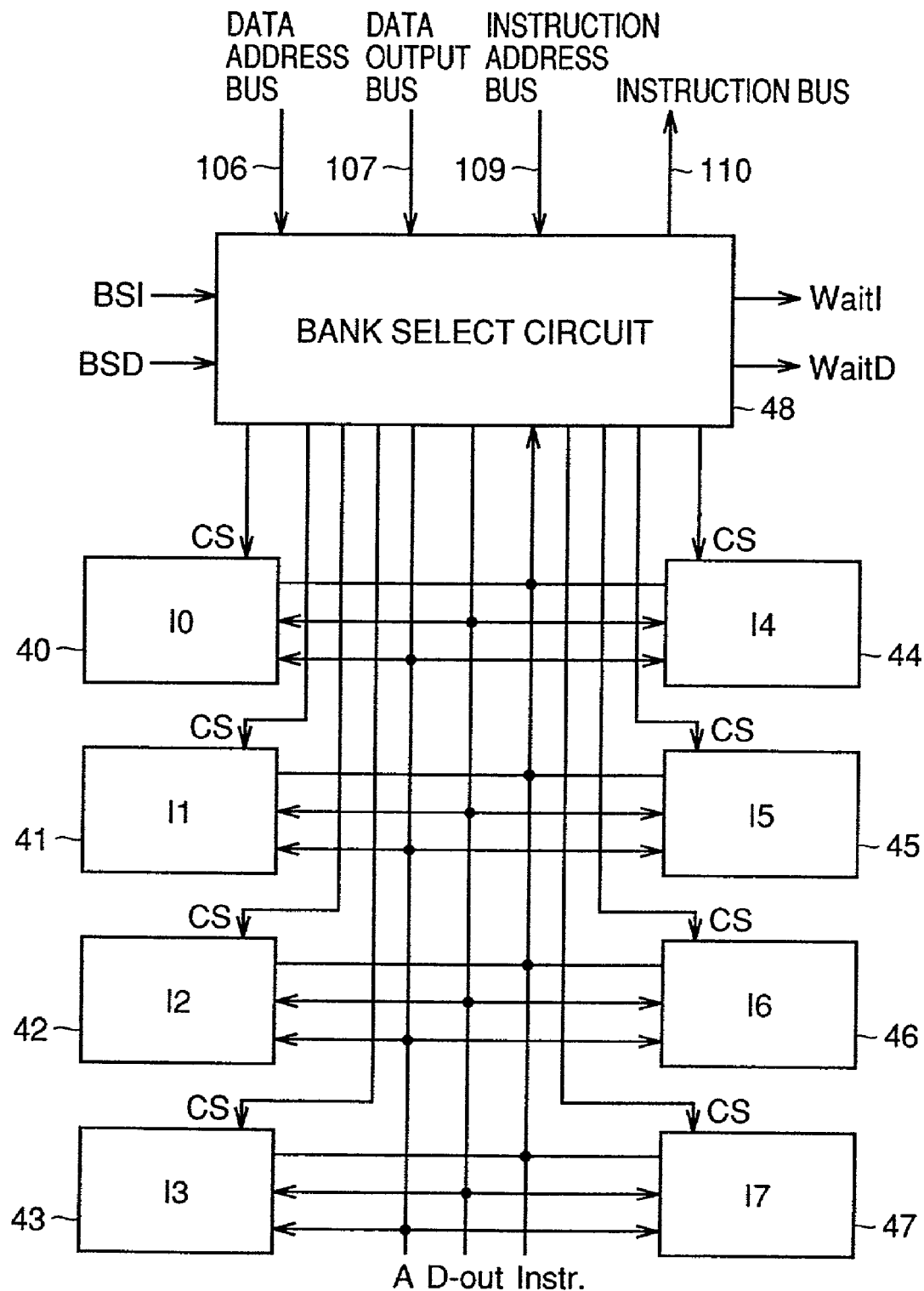
FIG. 5 is a block diagram showing a schematic structure of a low power instruction memory 103.

FIG. 5 is a block diagram showing a schematic structure of low power instruction memory 103. This low power instruction memory 103 includes eight memory banks 40-47, and a bank select circuit 48 selecting any of memory banks 40-47. Bank select circuit 48 is connected to data address bus 106, data output bus 107, instruction address bus 109 and instruction bus 110. Bank select circuit 48 receives a BSI (bus status indicating instruction) signal and BSD (bus status indicating data) signal output from core 100 to generate CS (chip select) signals to memory banks 40-47.

Low power instruction memory 103 is a memory having a throughput of one clock cycle and latency of two clock cycles. The reason thereof will be described afterwards. Since half a clock cycle is used for the address transfer from core 100 and the transfer of the readout instruction code, the latency in fetching the instruction code of core 100 corresponds to three clock cycles. Since the address transfer from core 100 and the transfer of the readout instruction code are pipelined with respect to memory access, the throughput is the same one clock cycle.

When access is effected continuously with respect to different memory banks, core 100 can fetch an instruction speedily with the throughput of one clock cycle. When access is effected continuously with respect to the same memory bank, there will be the waste of one clock cycle since the throughput corresponds to two clock cycles.

Figure 6:
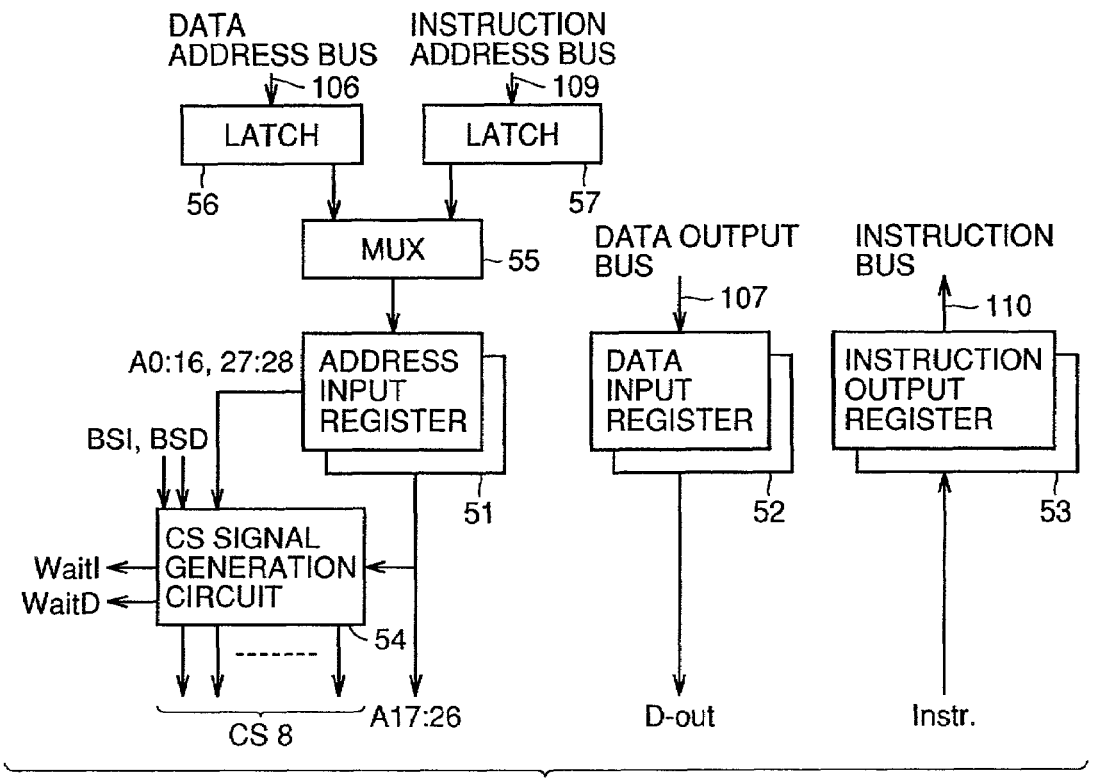
FIG. 6 is a block diagram to describe the detail of a bank select circuit 48.

FIG. 6 is a block diagram to describe bank select circuit 48 in detail. Bank select circuit 48 includes a latch 56 to which data address signals 106 are input, a latch 57 to which instruction address signals 109 are input, a multiplexer 55 selecting the outputs from latches 56 and 57, address input registers 51, data input registers 52, instruction output registers 53, and a CS signal generation circuit 54 generating the CS signals of memory banks 40-47.

Multiplexer 55 switches between data address signals stored in latch 56 and instruction address signals stored in latch 57 for output. Address input registers 51 retain the address output from multiplexer 55. Data input registers 52 retain the contents of data output bus 107. Instruction output registers 53 retain the instruction code output from memory banks 40-47 and provides the same to instruction bus 110.

Address input registers 51, data input registers 52 and instruction output registers 53 are respectively double buffers. When access is effected continuously with respect to the same memory bank, the throughput will correspond to two clock cycles, so that one clock cycle will be wasted. Thus, the structure of a double buffer is employed to retain the address or the like of the next instruction while retaining the value for two clock cycles.

CS signal generation circuit 54 generates the CS signals to memory banks 40-47 according to signals BSI and BSD and the address (A0-A16, A27, A28) retained in address input register 51. When access is effected continuously with respect to the same memory bank, one wait is inserted since the throughput corresponds to two clock cycles. Signals WaitI and WaitD are rendered active in inserting "wait" in accessing respective instruction or data.

Figure 7:
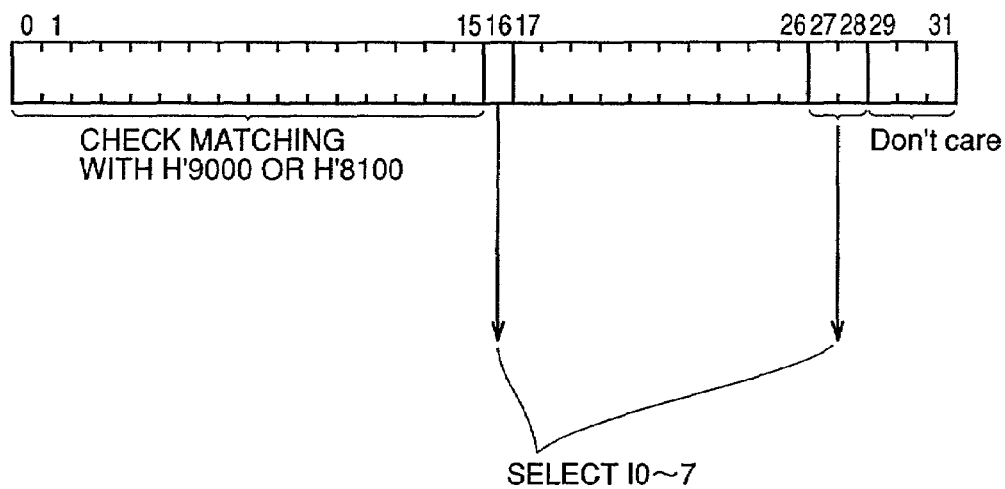
FIG. 7 is a diagram to describe generation of a CS signal to a memory bank in a low power instruction memory 103.

FIG. 7 is a diagram to describe generation of the CS signals to memory banks. As shown in FIG. 7, addresses A0-A15 of the 32-bit address are decoded to determine access to memory banks 40-47. Identification is made of which of memory banks 40-47 is accessed by decoding the three bits of A16, A27 and A28. A29-A31 take arbitrary values since low power instruction memory 103 is accessed on a 8-byte basis. In FIG. 7, H' indicates a hexadecimal.

Figure 8:
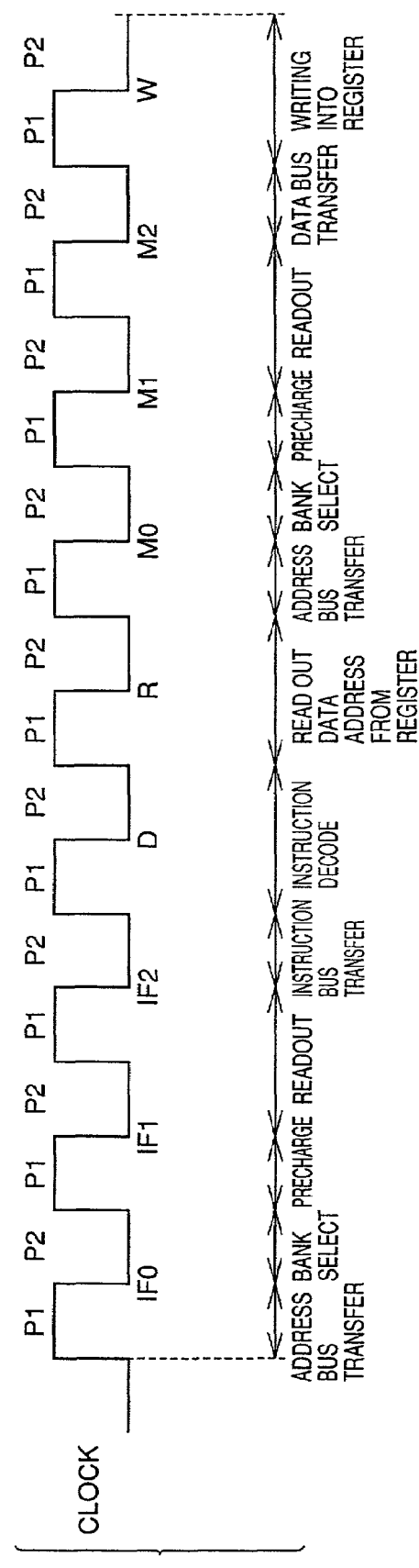
FIG. 8 is a diagram to describe the pipeline process when accessing memory banks 40-47.

FIG. 8 is a timing chart to describe the pipeline process in accessing memory banks 40-47 in low power instruction memory 103. FIG. 8 is directed to explain that the throughput is one clock cycle and the latency is two clock cycles. The details of the pipeline process will be described afterwards.

In FIG. 8, IF0-IF2, D, R, M0-M2 and W indicate the stages of the pipeline. At instruction fetch stage IF0, an instruction address is transferred via instruction address bus 102 at the first ½ clock. Then, selection of memory banks 40-47 is effected at the next ½ clock.

At instruction fetch stage IF1, the precharging operation of the selected memory bank is carried out at the first ½ clock. The CS signal of one of the memory banks is output from CS signal generation circuit 54 at this timing, whereby the bit line in the selected memory bank is rendered active. Then, the instruction is fetched at the next ½ clock and the first ½ clock of instruction fetch stage IF2. At instruction fetch stage IF1, the address bus transfer of the next instruction is carried out to fetch the next instruction. The process is carried out in a pipeline manner.

At instruction decode stage D, the fetched instruction is decoded. When the fetched instruction is a load instruction, the data address is read out from the register at read register stage R. At data memory access stage M0, data address bus transfer and bank selection are effected. At data memory access stages M1 and M2, data readout and data bus transfer are carried out. At write back stage W, the readout data is written into the register. The timing of accessing low power data memory 104 is identical to the access timing to low power instruction memory 103.

When core 100 fetches an instruction, addresses A27 and A28 are altered "00", "01", "10", "11" cyclically since access is effected to continuous addresses. This means that access is effected to a different memory bank, and the same memory bank will not be accessed continuously.

Figure 9:
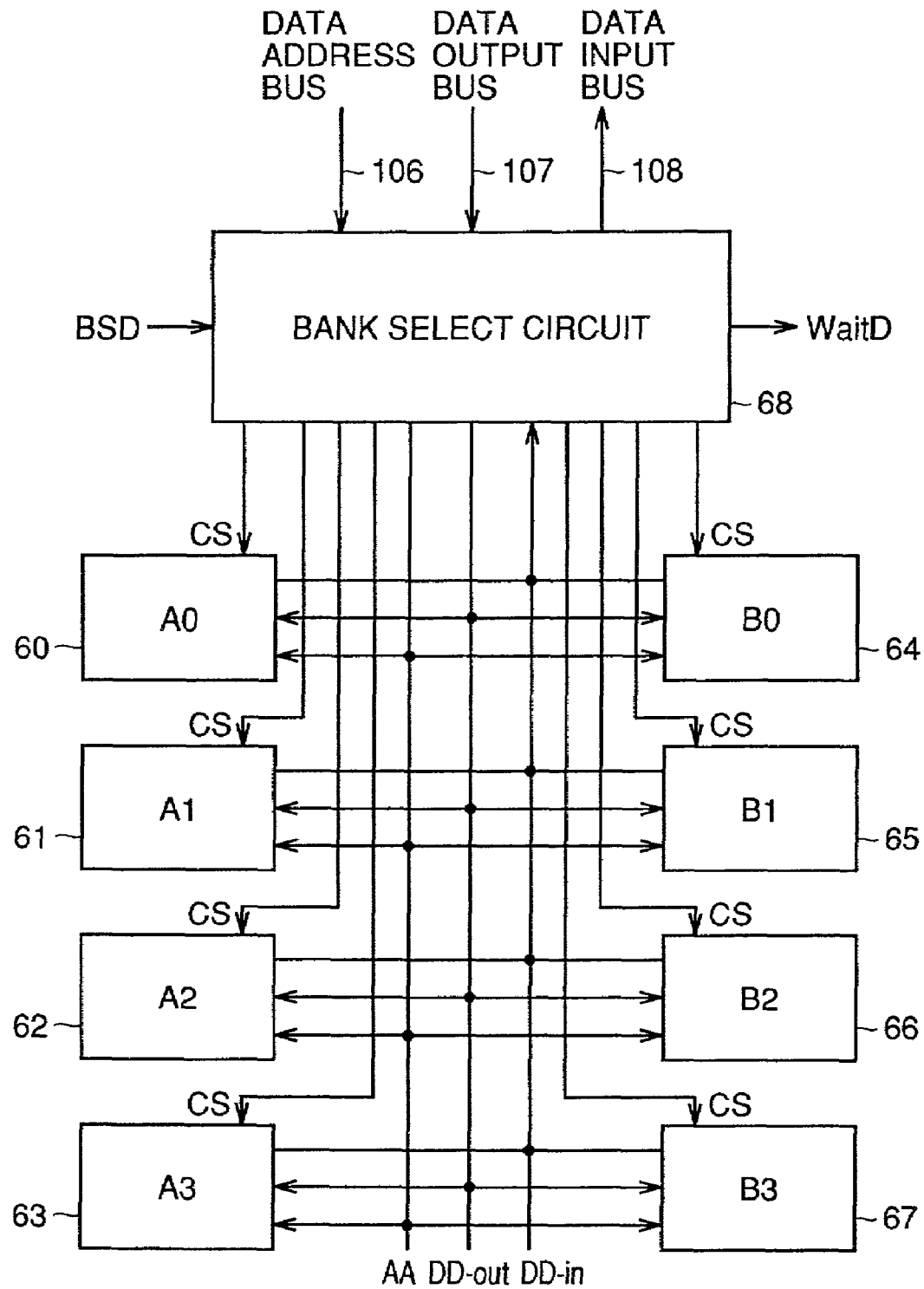
FIG. 9 is a block diagram showing a schematic structure of a low power data memory 104.

FIG. 9 is a block diagram showing a schematic structure of low power data memory 104. Low power data memory 104 includes eight memory banks 60-67, and a bank select circuit 68 selecting any of memory banks 60-67. Bank select circuit 68 is connected to data address bus 106, data output bus 107 and data input bus 108. Bank select circuit 68 receives a signal BSD output from core 100 to generate the CS signals to memory banks 60-67.

Low power data memory 104 has a throughput of one clock cycle and latency of 2 clock cycles. Since half a clock cycle is used for each address transfer from core 100 and transfer of the readout data, the latency in memory access by core 100 corresponds to three clock cycles. Since the address transfer from core 100 and transfer of the readout data are pipelined with the memory access, the throughput is the same one clock cycle.

When access is effected continuously to different memory banks, the throughput becomes one clock cycle, so that core 100 can carry out memory access speedily. When access is effected continuously with respect to the same memory bank, the throughput becomes two clock cycles, so that one clock cycle will be wasted.

Figure 10:
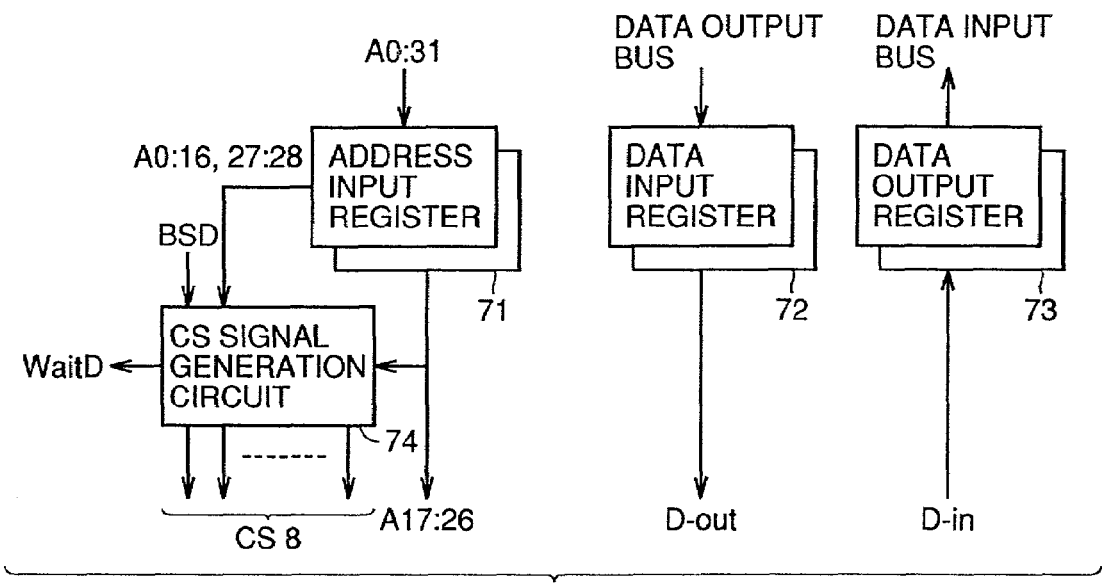
FIG. 10 is a block diagram to describe the detail of a bank select circuit 68.

FIG. 10 is a block diagram to describe bank select circuit 68 in detail. Bank select circuit 68 includes address input registers 71, data input registers 72, data output registers 73, and a CS signal generation circuit 74 generating the CS signals of memory banks 60-67.

Address input registers 71, data input registers 72 and data output registers 73 are double buffers. When access is effected continuously with respect to the same memory bank, the throughput corresponds to two clock cycles, and one clock cycle will be wasted. Therefore, the structure of a double buffer is employed to store the address and the like of the next data while retaining the value for two clock cycles.

CS signal generation circuit 74 generates the CS signals of memory banks 60-67 according to signal BSD and the address (A0-A16, A27, A28) stored in address input registers 71. When access is effected continuously to the same memory bank, the throughput becomes two clock cycles, so that one wait is inserted. Signal WaitD is rendered active in inserting "wait" in the memory access.

Figure 11:
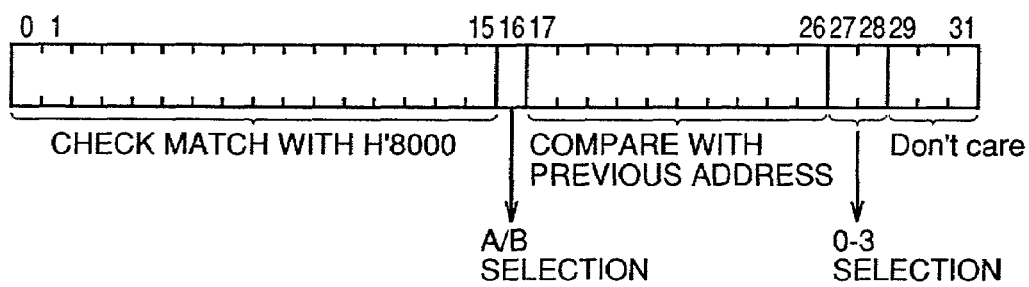
FIG. 11 is a diagram to describe generation of a CS signal to a memory bank in a lower power data memory 104.

FIG. 11 is a diagram to describe generation of the CS signals of the memory banks. As shown in FIG. 11, addresses A0-A15 of the 32-bit address are decoded to determine access to memory banks 60-67. Identification is made of which of memory banks 60-67 is accessed by decoding the three bits of A16, A27 and A28. A16 indicates whether the access is towards memory banks 60-63 or towards memory banks 64-67. Addresses A29-A31 take arbitrary values since low power data memory 104 is accessed on an 8 byte basis.

In digital signal processing, the data of continuous addresses are often accessed sequentially. When data is accessed on an 8 byte basis, addresses A27 and A28 are altered "00", "01", "10", "11" cyclically. Therefore, a different memory bank is always accessed. The same memory bank will not be accessed continuously.

When data is accessed in units of 1 byte, 2 bytes and 4 bytes, data of 8 bytes are stored in data output register 73 at the first memory access. In the second memory access onward, access to the memory bank is not effected, and the data stored in data output register 73 is sequentially output to data input bus 108. Therefore, the throughput is maintained at 1 clock cycle.

In digital signal processing, the same number of variables and coefficients are often read out from low power data memory 104. Therefore, the region is divided into the region (bank memories 60-63) where variables are stored and the region (bank memories 64-67) where coefficients are stored depending on the value of address A16 to suppress access to the same bank memory in the case where a variable and a coefficient are read out alternately.

Figures 12A, 12B, 12C:
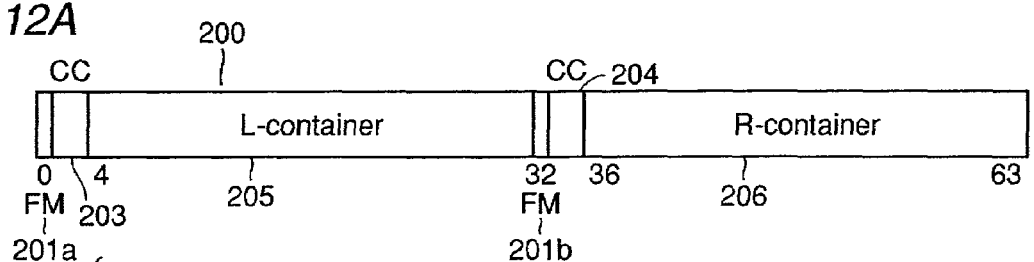
FIGS. 12A-12C are diagrams to describe the format of an instruction executed by core 100.

FIGS. 12A-12C are diagrams to describe the format of instructions executed by core 100. As shown in FIG. 12A, the instruction executed by core 100 is a 2-way VLIW instruction, and includes an L container 205 and an R container 206 storing sub instructions, CC fields 203 and 204 specifying the execution condition of each sub instruction, and FM fields 101a and 201b defining the execution sequence of each sub instruction or a long sub instruction.

CC fields 203 and 204 specify conditions depending upon flags F0 and F1 in the PSW. For example, when CC field 203 is "000", as shown in FIG. 12B, the sub instruction in L container 205 is unconditionally executed. When CC field 204 is "101", the sub instruction in R container 206 is executed when flag F0=1 and F1=1, and rendered invalid when flags F0 and F1 take other values.

FM fields 201a and 201b define the sub instruction execution sequence or a long sub instruction in L container 205 and R container 206. As shown in FIG. 12C, when the FM field is 00, the two sub instructions in L and R containers 205 and 206 are executed in parallel. When the FM field is 01, the sub instruction in L container 205 is first executed, and then the sub instruction in R container 206 is executed. When the FM field is 10, the sub instruction included in R container 206 is executed, and then the sub instruction in L container 205 is executed. When FM field is 11, one long sub instruction held in a divided manner in L and R containers 205 and 206 is executed.

FIGS. 13A-13H show the formats of sub instructions held in L and R containers 205 and 206. A short sub instruction has the length of 28 bits, and is classified into seven types of format. As shown in FIGS. 13A-13G, the type of operation is specified at bit positions 0-9 of the short sub instruction, and the operands of three at most are specified at bit positions 10-27. A long sub instruction has the length of 54 bits, wherein the type of operation is specified at bit positions 0-9 of the long sub instructions and three operands at most including the immediate data of 32 bits in length are specified at bit positions 10-53. The 32-bit immediate value of the long sub instruction is retained at bit positions 26-31, 36-43 and 46-63 in the VLIW instruction of FIG. 12A.

FIG. 13A shows the format of a sub instruction that carries out a memory access operation (LD instruction/ST instruction). This sub instruction includes a field (bit positions 0-7) specifying the operation contents (opcode), a field X (bit positions 8-9) providing specification of a register or an immediate value, fields Ra (bit positions 10-15) and Rb (bit positions 16-21) specifying the register number, and a field src (bit positions 22-27) specifying a register number or an immediate value of 6 bits in length. As shown in FIG. 13A, when the value of field X is 00, 01 or 11, field src provides the definition of a register number. When the value of field X is 10, field src provides definition of an immediate value. This sub instruction is used in the memory access operation by register indirect addressing. Rb++ and Rb−− indicate the addressing mode when register indirect addressing is carried out. Rb++ corresponds to a register indirect mode with a post increment whereas Rb−− corresponds to a register indirect mode with post decrement.

FIG. 13B shows the format of a sub instruction that carries out an operation between operands (ALU instruction) or a multiply-and-accumulate operation (AC instruction) stored in the general-purpose register. This sub instruction includes a field Y (bit number 8) specifying a register number or an immediate value. As shown in FIG. 13B, when the value of field Y is 0 and 1, src indicates a register number and an immediate value, respectively.

FIGS. 13C-13G show the formats of sub instructions that carry out branch operations (BRA instructions). As shown in FIGS. 13C-13G, specification is made of a register or an immediate value by a field F (bit position 8). Field Z (bit position 9) provides specification of a branch instruction referring to zero flag. The field at bit positions 10-27 specifies branch displacement by the register or immediate value.

FIG. 13H shows the format of a long sub instruction. This sub instruction includes a field (bit positions 0-7) specifying the operation contents (opcode), fields Ra (bit positions 10-15) and Rb (bit positions 16-21) specifying a register number, and a field imm (bit positions 22-53) specifying an immediate value of 32 bits in length. This long sub instruction is used in a memory access operation, an operation between operands retained in the general-purpose register, and a branch operation.

FIGS. 14A-14H are diagrams to describe the pipeline process of core 100 of the present embodiment. FIGS. 14A-14D show a pipeline process when an instruction fetched from low power instruction memory 103 is executed, and represent an ALU instruction, MAC instruction, LD/ST instruction, and a BRA instruction, respectively. Stages IF0-IF2 represent instruction fetch stages. Stage D represents an instruction decode stage.

Stage R functions to read out an operand from register file 120. Stage R/A functions to read out the PC value from register file 120, or add a displacement value to the read out PC value to calculate a branch destination address. Stages E0 and E1 function to carry out the operation for instruction execution. Stages M0-M2 function to effect access to a data memory. Stage W functions to write an operand into a general-purpose register.

FIGS. 14E-14H show a pipeline process when an instruction fetched from high speed instruction memory 101 is executed, and represent an ALU instruction, MAC instruction, LD/ST instruction and BRA instruction, respectively. These pipeline processes differ from those of FIGS. 14A-14D in that the instruction fetch stage includes two stages IF0 and IF1, and the data memory access stage includes two stages M0 and M1. The two stages of the data memory access stage corresponds to the access to high speed data memory 102. The data memory access stage includes three stages M0-M2 when low power data memory 104 is to be accessed.

As shown in FIGS. 14C and 14G. data transfer contention occurs at the data bus when the data memory is accessed at a plurality of pipeline cycles of M0-M2 or M0-Ml in the execution of the LD/ST instruction. Therefore, there was a problem that the store instruction cannot be executed immediately after execution of a load instruction. In the present embodiment, core 100 transfers data via data input bus 108 when the load instruction is executed and via data output bus 107 when the store instruction is executed. Therefore, the pipeline will not be disturbed even in the case where a store instruction is to be executed immediately after execution of a load instruction. Since the data transfer direction is predetermined in respective data buses, there is the advantage that the circuitry is simplified.

Thus, the number of stages in the pipeline process is set variable corresponding to the case where core 100 accesses high speed memory 101 or 102 or accesses low power memory 103 or 104. The timing in the pipeline process when an instruction fetched from low power instruction memory 103 is executed has been described with reference to FIG. 8.

Figure 15:
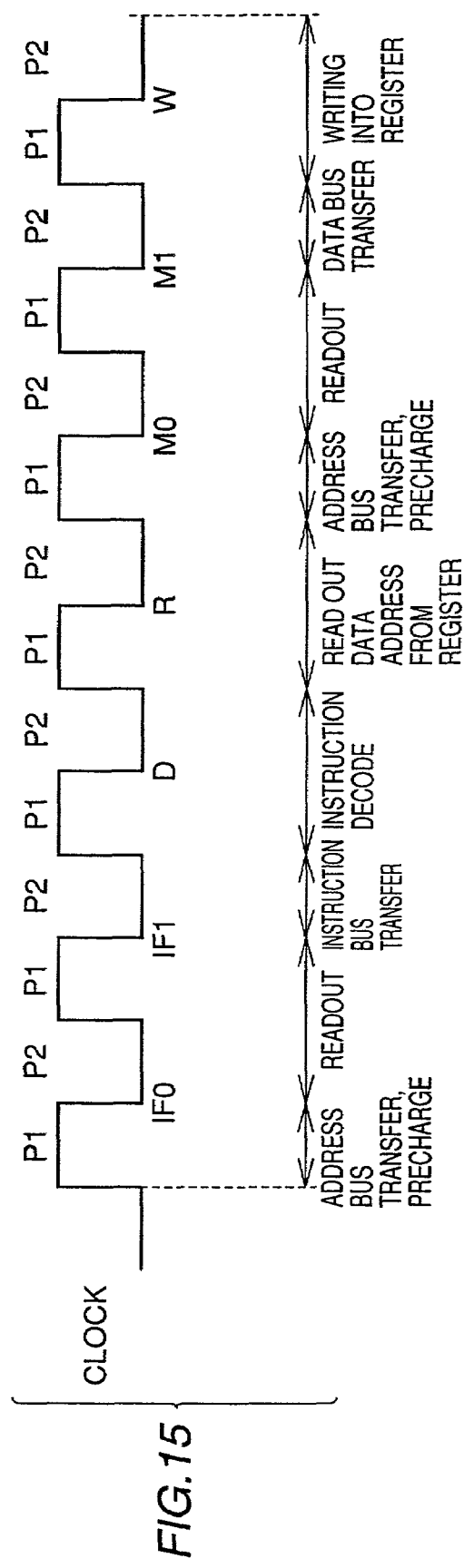
FIG. 15 is a diagram to describe the pipeline process when executing an instruction fetched from a high speed instruction memory 101.

FIG. 15 is a timing chart to describe the pipeline process when an instruction fetched from high speed instruction memory 101 is executed. At instruction fetch stage IF0, the address bus transfer operation to fetch an instruction and the precharge operation are carried out simultaneously at the first ½ clock. Since this precharge is always carried out when high speed instruction memory 101 is accessed irrespective of the value of the address, access ends one clock cycle earlier than the case where low power instruction memory 103 is accessed.

Then, the instruction is fetched at the next ½ clock and the first ½ clock of instruction fetch stage IF1. At instruction fetch stage IF1, the address bus transfer of the next instruction is carried out to fetch the next instruction. Processing is effected in a pipeline manner.

At instruction decode stage D, the fetched instruction is decoded. When the fetched instruction is a load instruction, a data address is read out from the register at read register stage R. Then, at data memory access stage M0, precharging with respect to high speed data memory 102 is carried out simultaneous to the data address bus transfer. Since this precharge is always carried out when high speed data memory 102 is accessed irrespective of the value of the address, the access ends 1 clock cycle earlier than the case where low power data memory 104 is accessed.

At the next ½ clock of stage M0 and stage M1, data readout and data bus transfer are carried out. At write back stage W, the read out address is written into the register.

FIG. 16 shows a list of the load/store instructions, data transfer instructions and compare instructions. FIG. 17 shows a list of arithmetic operation instructions, logical operation instructions, shift operation instructions and bit operation instructions. FIG. 18 shows a list of branch instructions, OS (Operating System) related instructions, DSP (Digital Signal Processor) related instructions, repeat instructions and debugger supporting instructions. In FIGS. 16-18, the upper case characters represent the mnemonic of each sub instruction, followed by the contents of the operation of that sub instruction. The contents of the operation of respective sub instructions are described in detail in FIGS. 16-18. Therefore, detailed description will not be provided here.

Figure 19:
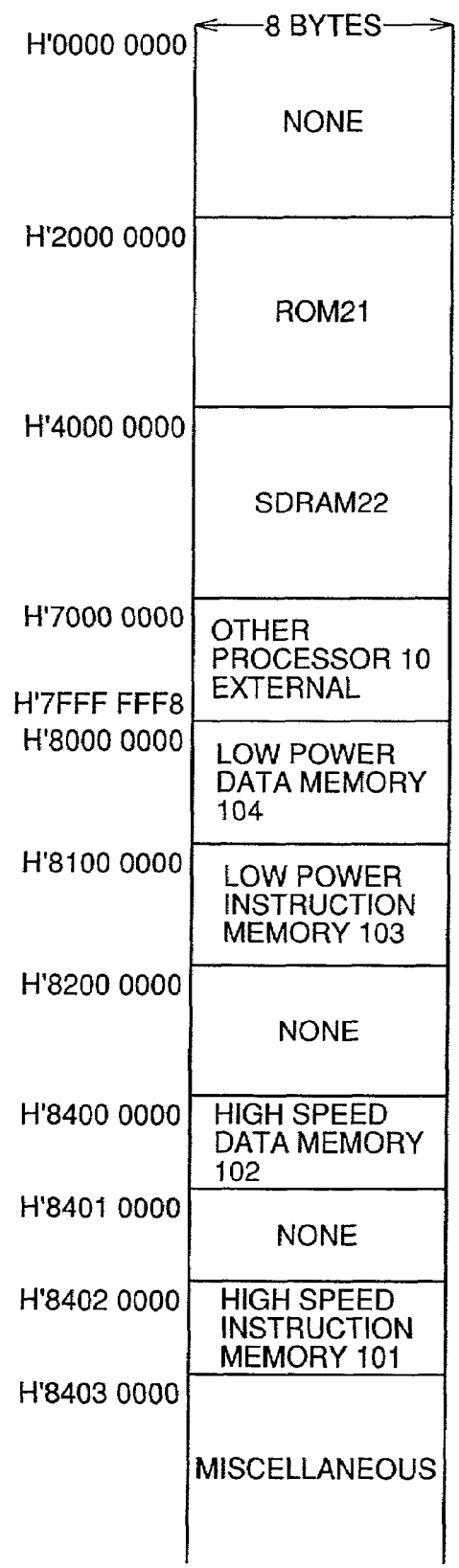
FIG. 19 shows an example of a memory map of processor 10 according to an embodiment of the present invention.

FIG. 19 shows an example of a memory map of processor 10 of the present embodiment. As shown in FIG. 19, each memory is differentiated by the address value. Core 100 determines the number of cycles from the start of memory access to the end of memory access, i.e., the number of stages of the pipeline, according to the address value. As shown in FIG. 2, bus contention will not occur since the fetch of an instruction from high speed instruction memory 101 and low power instruction memory 103 is carried out through a bus differing from the bus of accessing high speed data memory 102 and low power data memory 104.

In digital signal processing, a loop is often employed in the process of an FIR (Finite Impulse Response) filter, and the like. In core 100 of the present embodiment, the loop process is implemented by hardware and supports a repeat instruction (REPEAT0, REPEAT1) to substantially process the branching for a loop at a zero clock cycle. This repeat instruction will be described in detail hereinafter.

FIG. 20 shows the operation of REPEAT1 and an example of the program of an FIR filter process using this operation. As shown in the operation of REPEAT1, the number of loop passes "count" and the distance from the first instruction to the last instruction of the loop "pcaddr" are specified. Into each of registers RPT1_C, RPT1_S, RPT1_E and RPT1_I (0:5) are applied the number of loop passes, the loop start address (the instruction address immediately succeeding REPEAT1 instruction), the loop end address, and six instructions from the beginning of the loop, respectively. The RP1 bit and the FS1 bit of the PSW are set. The first instruction to the last instruction in the loop are executed for the number of loop passes "count".

In the example of the program of FIG. 20, the loop passes "count" is set to 20, and the distance "pcaddr" from the first instruction to the last instruction in the loop is set to 48. The process from START to END, i.e. the process formed of six VLIW instructions executing in parallel an LD2W instruction and a MAC0 instruction, is repeated twenty times.

Figure 21:
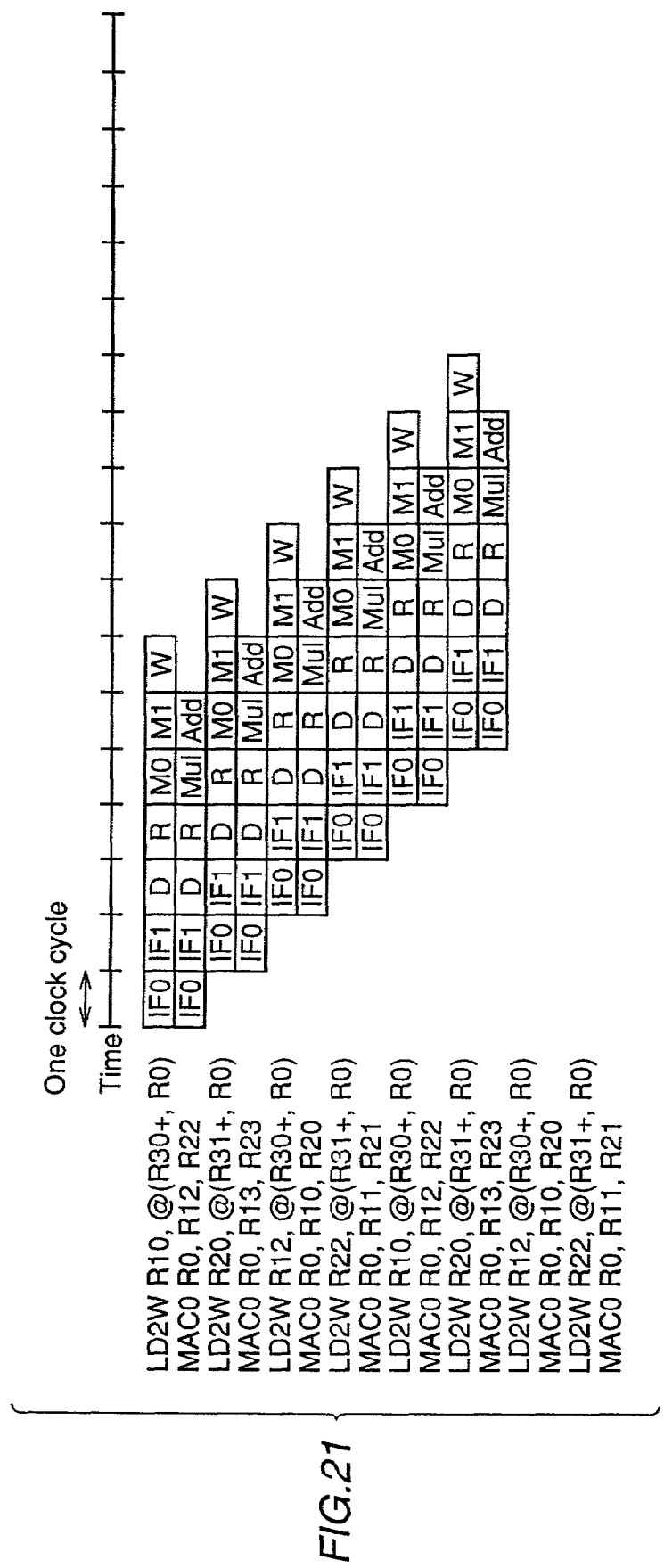
FIG. 21 is a diagram to describe the pipeline process when the program of FIG. 20 is executed.

FIG. 21 is a diagram to describe the pipeline process when the program of FIG. 20 is executed. Instructions LD2W and MAC0 are fetched from high speed instruction memory 101. Memory operation unit 130 and integer operation unit 140 process the instructions of LD2W and MAC0 in a pipelined manner. The multiply-and-accumulate operation of one result for one clock cycle is stored in accumulator A0.

In the first loop immediately succeeding execution of instruction REPEAT1, bit FS1 is set. The VLIW instruction from START to END is executed, and the six VLIW instructions are written into six registers RPT1_I(0:5). At the last instruction in the first loop, bit FS1 is reset. The VLIW instruction stored in register RPT1_I(0:5) is fetched and access to high speed instruction memory 101 is not effected from the second loop onward up to the last loop. The value in register RPT1_C is decremented by 1 according to the number of executions of the loop. When the value of register RPT1_C becomes 0, the loop ends, and bit RP1 is reset.

When processor 10 accepts an interruption request during loop execution, execution of this program is interrupted, and the current task A is switched to the new task B. Before task B is executed, the OS stores the PSW value of the executing task A saved in the BPSW and the execution environment of task A including each of registers RPT1_C, RPT1_S, RPT1_E and RPT1_I(0:5). The OS restores the execution environment of task A when returning to the process of task A. Therefore, the loop process actuated by instruction REPEAT1 will not be ruined by switching the task.

FIG. 22 show the operation of REPEAT0 and an example of the program of an FIR filter process using this operation. As shown in the operation of REPEAT0, the number of loop passes "count", and the distance "pcaddr" from the first instruction to the last instruction in the loop are specified. In each of registers RPT1_C, RPT0_S, RPT0_E and RPT0_I are stored respective loop passes, the loop start address (instruction address immediately succeeding instruction REPEAT0), loop end address, and the first instruction of the loop. Bits RP0 and FS0 of the PSW are set. Then, execution is effected from the first instruction to the last instruction of the loop for the number of loop passes "count".

In the program shown in FIG. 22, the loop passes "count" is set to 10, and distance "pcaddr" from the first instruction to the last instruction of the loop is specified to 64. Then, the process from START to END, i.e. a process formed of eight VLIW instructions executing instructions LD2W and MAC0 in parallel, are repeated ten times.

Figure 23:
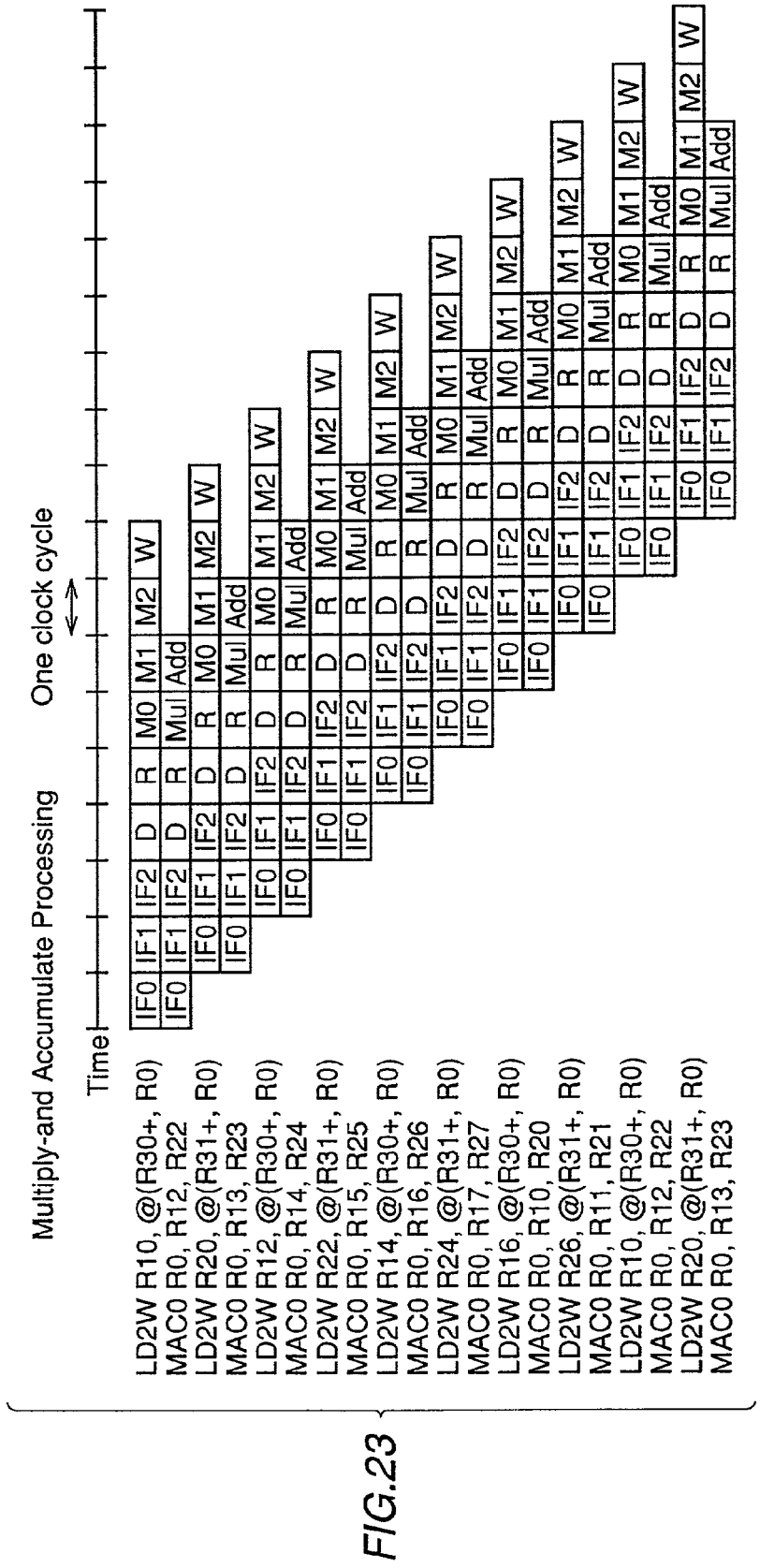
FIG. 23 is a diagram to describe a pipeline process when the program of FIG. 22 is executed.

FIG. 23 is a diagram to describe the pipeline process when the program of FIG. 22 is executed. Instructions LD2W and MAC0 are fetched from low power instruction memory 103. Memory operation unit 130 and integer operation unit 140 process instructions LD2W and MAC0 in parallel in a pipelined manner. One multiply-and-accumulate operation result for one clock cycle is stored in accumulator A0.

At the first loop immediately succeeding execution of instruction REPEAT0, bit FS0 is set. A VLIW instruction from START to END is executed, and the first VLIW instruction (VLIW instruction with label START) is written into register RPT0_I. At the last instruction in the first loop, bit FS0 is reset. The first VLIW instruction stored in register RPT0_I and instructions other than the first VLIW instruction stored in low power instruction memory 103 are fetched and executed from the second loop onward until the last loop. The value of register RPT0_C is decremented by one according to the number of executions of the loop. When the value of register RPT0_C becomes 0, the loop ends and bit RP0 is reset.

The eight VLIW instructions of FIG. 22 are retained in memory banks 40-47 of low power instruction memory 103. In the first loop, a VLIW instruction is accessed sequentially from memory bank 40. A VLIW instruction is fetched for every one clock cycle. In the program example of FIG. 22, the same bank will not be accessed continuously since there are eight VLIW instructions, and the throughput becomes 1. When the number of the VLIW instructions in the loop is (number of banks×n+1), the last instruction and the first instruction in the loop will exist in the same memory bank. One wait is inserted, so that the throughput is 2.

However, in processor 10 of the present embodiment, the first instruction in the loop is retained in register RPT0_I. Therefore, access to the same memory bank will not be effected continuously. Therefore, the pipeline will not be disturbed as shown in FIG. 23 independent of the number of VLIW instructions in the loop.

Figure 24:
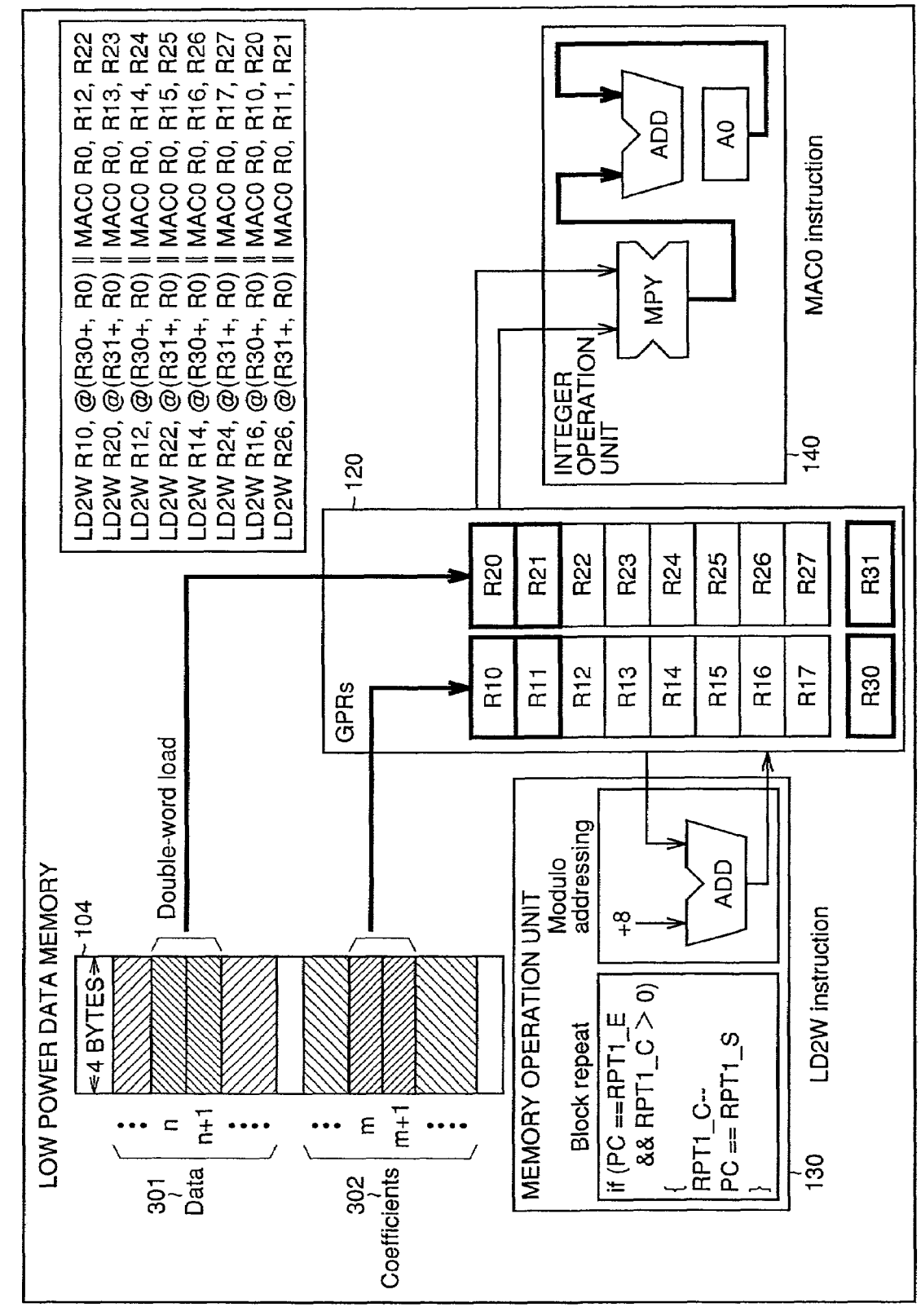
FIG. 24 shows the data flow when the loop portion of the program of FIG. 22 is executed.

FIG. 24 shows the data flow when the loop portion of the program of FIG. 22 is executed. Memory operation unit 130 and integer operation unit 140 execute instructions LD2W and MAC0 in parallel. Memory operation unit 130 executes alternately an instruction LD2W loading two coefficients at a time from a coefficient region 302 (addresses H' 8000 8100~H' 8000 8128) of low power data memory 104 into registers R10-R17, and an instruction LD2W loading two variables at a time from a variable region 301 (addresses H' 8000 0100~H' 8000 0128) of low power data memory 104 into registers R20-R27.

Memory operation unit 130 post-increments the pointers in register R30 or R31 by 8 at each instruction execution, and loads continuous coefficients and variables sequentially into register file 120. By the execution of the odd numbered LD2W instruction, memory operation unit 130 loads the coefficient data retained in memory banks 60-63 to registers R10-R17. By execution of instruction LD2W of an even-numbered order, memory operation unit 130 loads the variable data retained in memory banks 64-67 into registers R20-R27.

As shown in FIG. 11, A16, A27 and A28 are decoded in generating the CS signal of memory banks 60-67 of low power data memory 104. Therefore, memory banks 60-63 in low power data memory 104 correspond to variable region 301 and memory banks 64-67 correspond to coefficient region 302. Therefore, the pipeline will not be disturbed and access to the same memory bank will not occur even in the case where instruction LD2W of FIG. 22 is executed continuously.

Furthermore, continuous coefficients or variables will not exist in the same memory bank since the CS signals of memory banks are generated by decoding A27 and A28 even in the case where coefficients or variables are accessed continuously. Therefore, continuous access to the same bank will not occur as long as the post-increment addressing mode is employed.

In the present embodiment, a FIR filter process has been taken as example of the program that does not continuously access the same memory bank in low power instruction memory 103. However, access to continuous addresses is effected unless branching does not occur in the fetch of an instruction. Therefore, by decoding the addresses of the lower order and dividing the region into two or more memory banks, continuous access to the same memory bank will not be generated in an instruction execution other than branching.

When a coefficient and variable are stored in continuous address regions and sequentially accessed in a process other than the FIR filter process in digital signal processing, continuous access to the same memory bank will not occur if the addresses of the lower order bits are decoded and low power data memory 104 are divided into two or more memory banks.

According to the data processing apparatus of the present embodiment, memory operation unit 130 generates a pipeline stage corresponding to selection of a memory bank in low power instruction memory 103 and a pipeline stage corresponding to instruction readout, only the selected memory bank can be precharged to allow reduction of power consumption. Since pipeline stages IF0-IF2 are effected in parallel, the throughput of low power instruction memory 103 can be improved.

According to the data processing apparatus of the present embodiment, memory operation unit 130 generates a pipeline cycle corresponding to selection of a memory bank in low power instruction memory 103 and a pipeline cycle corresponding to instruction readout, only the selected memory bank can be precharged to allow reduction of power consumption. Since pipeline cycles IFO-1F2 are effected in parallel, the throughput of low power instruction memory 103 can be improved.

Since memory operation unit 130 generates a pipeline cycle corresponding to selection of a memory bank of low power data memory 104 and a pipeline cycle corresponding to data access, only the selected memory bank is precharged to allow reduction of power consumption. Since pipeline cycles MO-M2 are effected in parallel, the throughput of low power data memory 104 can be improved.

Since bank select circuit 68 generates the CS signal of memory banks 60-67 by decoding low order addresses A27 and A28, different memory banks are accessed when accessing data in continuous address regions. Therefore, disturbance of the pipeline can be prevented. Since address transfer and precharging are carried out in parallel without bank selection when data is accessed in high speed data memory 102, data can be accessed at high speed.

Since bank select circuit 68 generates the CS signals of memory banks 60-67 by decoding high order address A16, continuous access of the same memory bank when reading out a coefficient and a variable alternately is eliminated by storing the coefficient and variable in separate regions. Therefore, disturbance of the pipeline can be prevented.

Since memory operation unit 130 has the instruction immediately succeeding the repeat information retained in register RPT0_I or RPT1_I(n) in the execution of a repeat instruction, continuous access of the same memory bank is eliminated even in the case where branching from the last instruction in the loop to the first instruction in the loop. Therefore, reduction in the processing performance can be prevented.

Even in the case where the task is switched during executing of the loop, the loop process actuated by the repeat operation will not be damaged by switching the task since the OS saves the PSW value stored in the BPSW and the execution environment of the task including each of registers RPT1_C, RPT1_S, RPT1_E and RPT1_I(0:5) stored in the memory.

Since bit FS1 is set at the first loop and reset at the second loop onward, the execution status of the repeat instruction can be identified easily.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus comprising:
an instruction memory in which an instruction is stored;
a data memory in which data is stored;
an instruction decoder decoding a fetched instruction;
a memory operation unit coupled to said instruction memory, said data memory and said instruction decoder, fetching an instruction stored in said instruction memory, and accessing said data memory according to a decode result of said instruction decoder; and
an integer operation unit carrying out an integer operation according to a decode result of said instruction decoder,
said instruction memory including a plurality of instruction memory banks,
said memory operation unit generating a pipeline cycle corresponding to selection of an instruction memory bank to be accessed in a following pipeline cycle and a pipeline cycle corresponding to an access to an instruction memory bank without any accesses to other instruction memory banks to carry out low power consumption pipeline processing when a plurality of instructions are fetched from the plurality of instruction memory banks, wherein
said instruction memory further includes a high speed instruction memory, and
said memory operation unit generates a pipeline cycle corresponding to instruction readout to carry out a pipeline process when fetching an instruction from said high speed instruction memory, and performs a pipeline control having a same throughput and a different latency compared to the access to said instruction memory when accessing to said high speed instruction memory,
said data memory includes a plurality of data memory banks,
said memory operation unit generates a pipeline cycle corresponding to selection of a data memory bank and a pipeline cycle corresponding to data access to carry out a pipeline process when accessing said plurality of data memory banks,
said data memory further includes a second bank select circuit decoding an address including a high order address to generate chip select signals of said plurality of data memory banks in order to divide said plurality of data memory banks into two different regions, and said second bank select circuit decodes an address including a low order address to generate chip select signals of said plurality of data memory banks so that a different data memory bank in said plurality of data memory banks is accessed when data at continuous addresses in said two different regions are accessed.

2. A data processing apparatus comprising:

an instruction memory in which an instruction is stored;

a data memory in which data is stored;

an instruction decoder decoding a fetched instruction;

a register file;

a memory operation unit coupled to said instruction memory, said data memory and said instruction decoder, fetching an instruction stored in said instruction memory, and accessing said data memory according to a decoded result of said instruction decoder; and an integer operation unit carrying out an integer operation according to a decoded result of said instruction decoder, said memory operation unit retaining an instruction in a loop of instructions corresponding to a repeat instruction in a dedicated register in said register file when said repeat instruction is executed, and executing the loop of instructions while fetching the instruction retained in said dedicated register;

wherein said memory operation unit generates a pipeline cycle corresponding to selection of an instruction memory bank to be accessed in a following pipeline cycle and a pipeline cycle corresponding to an access to an instruction memory bank without any accesses to other instruction memory banks to carry out a low power consumption pipeline process when fetching an instruction from said plurality of instruction memory banks, wherein said register file comprises a processor status word, wherein said memory operation unit:

refers to a first flag indicating a first execution cycle of said loop in said processor status word at the first execution cycle, and retains, in the register of said register file, the instruction in the loop of instructions fetched from said instruction memory when said repeat instruction is executed, and refers to a second flag indicating a second execution cycle to a last execution cycle of said loop in said processor status word at the second execution cycle to the last execution cycle, and executes said loop while fetching the instruction retained in said dedicated register.

3. The data processing apparatus according to claim 2, wherein said memory operation unit saves a plurality of registers including said dedicated register and switches a task in a task switch operation.

* * * * *